United States Patent
Zaidman et al.

(10) Patent No.: US 10,649,657 B2
(45) Date of Patent: May 12, 2020

(54) LOG-BASED STORAGE FOR DIFFERENT DATA TYPES IN NON-VOLATILE MEMORY

(71) Applicant: Western Digital Technologies, Inc., San Jose, CA (US)

(72) Inventors: Mikhael Zaidman, Jerusalem (IL); Eyal Ittah, Alfe-Menashe (IL); Rotem Sela, Haifa (IL); Amir Shaharabany, Yair (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 5 days.

(21) Appl. No.: 15/933,354

(22) Filed: Mar. 22, 2018

(65) Prior Publication Data

US 2019/0294333 A1 Sep. 26, 2019

(51) Int. Cl.
*G06F 3/00* (2006.01)
*G06F 3/06* (2006.01)

(52) U.S. Cl.
CPC .......... *G06F 3/0604* (2013.01); *G06F 3/0631* (2013.01); *G06F 3/0652* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 8,898,376 B2 | 11/2014 | Aune | |
| 10,121,551 B1 * | 11/2018 | Miller | G11C 16/3431 |
| 2015/0193299 A1 | 7/2015 | Hyun et al. | |
| 2017/0017405 A1 | 1/2017 | Dubeyko et al. | |
| 2017/0017406 A1 | 1/2017 | Dubeyko et al. | |
| 2017/0139616 A1 | 5/2017 | Dubeyko et al. | |
| 2017/0139825 A1 | 5/2017 | Dubeyko et al. | |

* cited by examiner

*Primary Examiner* — Midys Rojas
(74) *Attorney, Agent, or Firm* — Kunzler Bean & Adamson, PC

(57) ABSTRACT

Apparatuses, systems, and methods are disclosed for log-based storage for different data types in non-volatile memory. An apparatus may include a non-volatile memory element and a controller. A non-volatile memory element may include a first portion of memory, an intermediate storage, and a second portion of memory. A controller may be configured to receive a plurality of data units. A controller may be configured to classify units of data using a first data type and a second data type. A controller may be configured to store a first unit of data having a first data type in a first portion of memory and a second unit of data having a second data type in intermediate storage. Further, a controller may relocate a second unit of data to a second portion of memory.

13 Claims, 8 Drawing Sheets ized at the flash translation layer. In a further embodiment, an
LOG-BASED STORAGE FOR DIFFERENT DATA TYPES IN NON-VOLATILE MEMORY

TECHNICAL FIELD

The present disclosure, in various embodiments, relates to non-volatile memory and more particularly relates to relocation reduction in a non-volatile memory device.

BACKGROUND

In non-volatile memory systems, a file system may control how data is stored and retrieved through interactions with a flash translation layer, which maps logical addresses for memory operations to physical addresses of a memory device. In certain embodiments, due to handling of data by the file system and the interaction of the file system with the flash translation layer, the flash translation layer may become unaware that an intermediate storage contains obsolete versions of data. Thus, the flash translation layer may relocate the obsolete versions of data into main memory.

SUMMARY

Apparatuses are presented for log-based storage for different data types in non-volatile memory. An apparatus, in one embodiment, includes a non-volatile memory element and a controller. A non-volatile memory element includes a first portion of memory, an intermediate storage, and a second portion of memory. A controller, in one embodiment, is configured to receive a plurality of data units. In a certain embodiment, a controller is configured to classify units of data using a first data type and a second data type. In a further embodiment, a controller is configured to store a first unit of data having a first data type in a first portion of memory and a second unit of data having a second data type in intermediate storage. Additionally, the controller may relocate a second unit of data to a second portion of memory.

Methods are presented for log-based storage for different data types in non-volatile memory. In one embodiment, a method includes classifying data by log type at a file system level. In certain embodiments, a method includes storing data in a first portion of memory and a second portion of memory based on a classification. In at least one embodiment, a method includes performing a first garbage collection in a first portion of memory as directed by a file system and a second garbage collection in a second portion of memory as directed by a flash translation layer.

An apparatus, in another embodiment, includes means for storing data in separate storage spaces based on a log type. In certain embodiments, an apparatus includes means for reclaiming a first portion of memory in a first storage space associated with a first log type. In a further embodiment, an apparatus includes means for reclaiming a second portion of memory in a second storage space associated with a second log type.

BRIEF DESCRIPTION OF THE DRAWINGS

A more particular description is included below with reference to specific embodiments illustrated in the appended drawings. Understanding that these drawings depict only certain embodiments of the disclosure and are not therefore to be considered limiting of the scope of the disclosure, the disclosure is described and explained with additional specificity and detail through the use of the accompanying drawings, in which.

DETAILED DESCRIPTION

Figure 1:
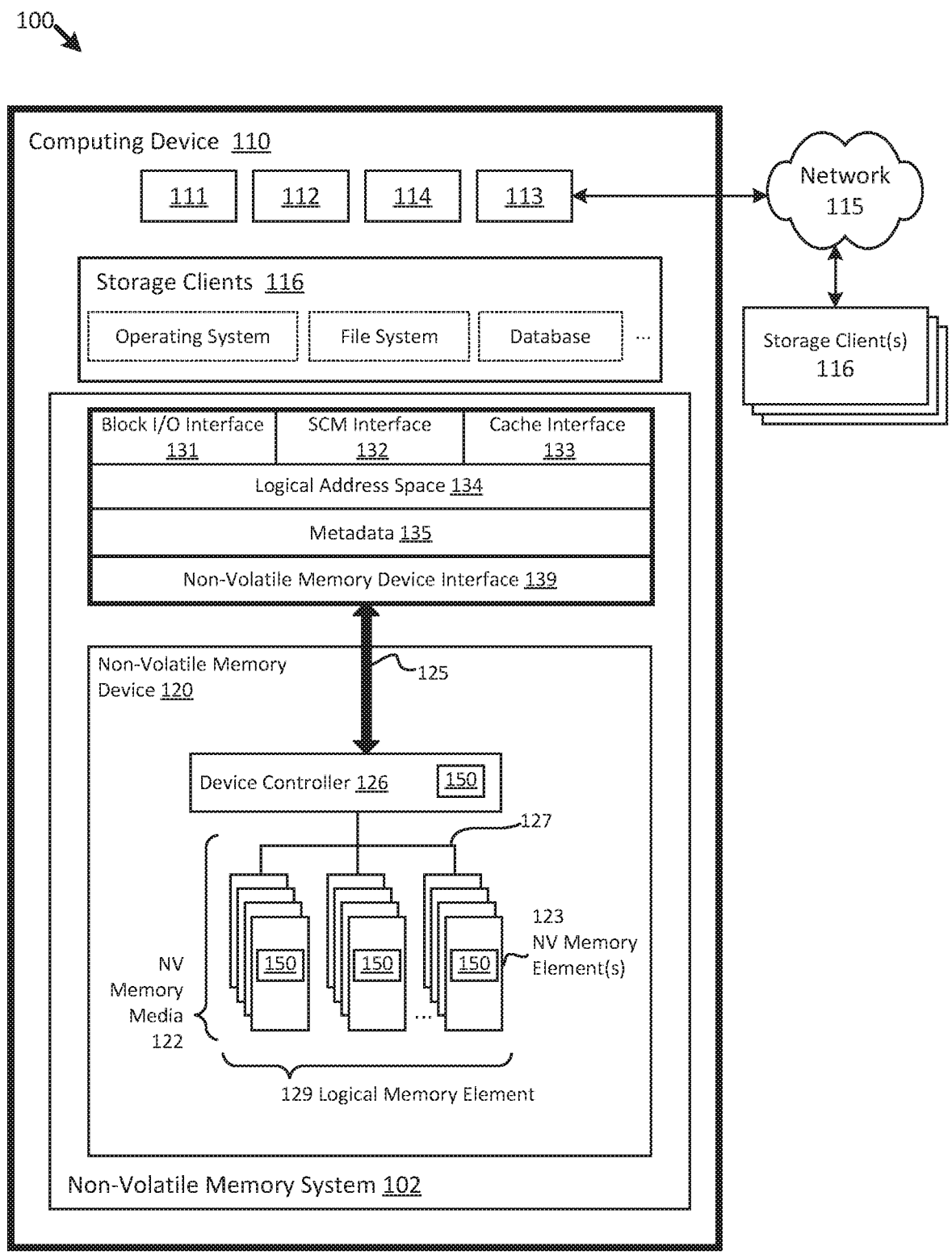
FIG. 1 is a schematic block diagram illustrating one embodiment of a system comprising non-volatile memory elements.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "circuit," "module," "apparatus," or "system." Furthermore, aspects of the present disclosure may take the form of a computer program product embodied in one or more non-transitory computer readable storage media storing computer readable and/or executable program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented at least partially in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may include a single instruction, or many instructions, and may even be distributed over several different code segments, among different programs, across several memory devices, or the like. Where a module or portions of a module are implemented in software, the software portions may be stored on one or more computer readable and/or executable storage media. Any combination of one or more computer readable storage media may be utilized. A computer readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

FIG. 1 is a block diagram of one embodiment of a system 100 comprising one or more storage management components 150 for a non-volatile memory device 120. Storage management components 150 may be part of one or more non-volatile memory elements 123, a device controller 126 external to the non-volatile memory elements 123, a device driver, or the like. Storage management components 150 may be part of a non-volatile memory system 102 of a computing device 110, which may comprise a processor 111, volatile memory 112, and a communication interface 113. The processor 111 may comprise one or more central processing units, one or more general-purpose processors, one or more application-specific processors, one or more virtual processors (e.g., the computing device 110 may be a virtual machine operating within a host), one or more processor cores, or the like. The communication interface 113 may comprise one or more network interfaces configured to communicatively couple the computing device 110 and/or device controller 126 to a communication network 115, such as an Internet Protocol (IP) network, a Storage Area Network (SAN), wireless network, wired network, or the like.

The non-volatile memory device 120, in various embodiments, may be disposed in one or more different locations relative to the computing device 110. In one embodiment, the non-volatile memory device 120 comprises one or more non-volatile memory elements 123, such as semiconductor chips or packages or other integrated circuit devices disposed on one or more printed circuit boards, storage housings, and/or other mechanical and/or electrical support structures. For example, the non-volatile memory device 120 may comprise one or more direct inline memory module (DIMM) cards, one or more expansion cards and/or daughter cards, a solid-state-drive (SSD) or other hard drive device, and/or may have another memory and/or storage form factor. The non-volatile memory device 120 may be integrated with and/or mounted on a motherboard of the computing device 110, installed in a port and/or slot of the computing device 110, installed on a different computing device 110 and/or a dedicated storage appliance on the network 115, in communication with the computing device 110 over an external bus (e.g., an external hard drive), or the like.

The non-volatile memory device 120, in one embodiment, may be disposed on a memory bus of a processor 111 (e.g., on the same memory bus as the volatile memory 112, on a different memory bus from the volatile memory 112, in place of the volatile memory 112, or the like). In a further embodiment, the non-volatile memory device 120 may be disposed on a peripheral bus of the computing device 110, such as a peripheral component interconnect express (PCI Express or PCIe) bus, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the non-volatile memory device 120 may be disposed on a data network 115, such as an Ethernet network, an Infiniband network, SCSI RDMA over a network 115, a storage area network (SAN), a local area network (LAN), a wide area network (WAN) such as the Internet, another wired and/or wireless network 115, or the like.

The computing device 110 may further comprise a non-transitory, computer readable storage medium 114. The computer readable storage medium 114 may comprise executable instructions configured to cause the computing device 110 (e.g., processor 111) to perform steps of one or more of the methods disclosed herein.

The non-volatile memory system 102, in the depicted embodiment, includes one or more storage management components 150. A storage management component 150, in one embodiment, may be configured to store data in different portions of memory based on a classification. By classifying the data and saving the data in separate portions of memory, a storage management component 150 may be able to reduce relocations of data saved in certain portions of memory. In particular, a first portion of memory may store data that is frequently updated and an intermediate storage may store data that is less frequently updated. The controller may limit the relocation of data in the first portion of memory into the second memory to reduce the amount of obsolete data that is relocated into the second memory. Storage management components 150 are described in greater detail below with regard to FIGS. 2-11C.

In one embodiment, a storage management component 150 may include logic hardware of one or more non-volatile memory devices 120, such as a device controller 126, a non-volatile memory element 123, other programmable logic, firmware for a non-volatile memory element 123, microcode for execution by a non-volatile memory element 123, or the like. In another embodiment, a storage management component 150 may include executable software code, stored on a computer readable storage medium for execution by logic hardware of a non-volatile memory element 123. In a further embodiment, a storage management component 150 may include a combination of both executable software code and logic hardware.

In one embodiment, the non-volatile memory device 120 is configured to receive storage requests from a device driver or other executable application via buses 125, 127, a device controller 126, or the like. The non-volatile memory device 120 may be further configured to transfer data to/from a device driver and/or storage clients 116 via the bus 125. Accordingly, the non-volatile memory device 120, in some embodiments, may comprise and/or be in communication with one or more direct memory access (DMA) modules, remote DMA modules, bus controllers, bridges, buffers, and so on to facilitate the transfer of storage requests and associated data. In another embodiment, the non-volatile memory device 120 may receive storage requests as an API call from a storage client 116, as an IO-CTL command, or the like.

According to various embodiments, a device controller 126 may manage one or more non-volatile memory devices 120 and/or non-volatile memory elements 123. The non-volatile memory device(s) 120 may comprise recording, memory, and/or storage devices, such as solid-state storage device(s) and/or semiconductor storage device(s) that are arranged and/or partitioned into a plurality of addressable media storage locations. As used herein, a media storage location refers to any physical unit of memory (e.g., any quantity of physical storage media on a non-volatile memory device 120). Memory units may include, but are not limited to: pages, memory divisions, blocks, sectors, collections or sets of physical storage locations (e.g., logical pages, logical blocks), or the like.

A device driver and/or the device controller 126, in certain embodiments, may present a logical address space 134 to the storage clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the non-volatile memory device 120 may maintain metadata 135, such as a logical to physical address mapping structure, to map logical addresses of the logical address space 134 to media storage locations on the non-volatile memory device(s) 120. A device driver may be configured to provide storage services to one or more storage clients 116. The storage clients 116 may include local storage clients 116 operating on the computing device 110 and/or remote, storage clients 116 accessible via the network 115 and/or communication interface 113. The storage clients 116 may include, but are not limited to: operating systems, file systems, database applications, server applications, kernel-level processes, user-level processes, applications, and the like.

A device driver may be communicatively coupled to one or more non-volatile memory devices 120. The one or more non-volatile memory devices 120 may include different types of non-volatile memory devices including, but not limited to: solid-state storage devices, semiconductor storage devices, SAN storage resources, or the like. The one or more non-volatile memory devices 120 may comprise one or more respective device controllers 126 and non-volatile memory media 122. A device driver may provide access to the one or more non-volatile memory devices 120 via a traditional block I/O interface 131. Additionally, a device driver may provide access to enhanced functionality through the SCM interface 132. The metadata 135 may be used to manage and/or track data operations performed through any of the block I/O interface 131, SCM interface 132, cache interface 133, or other, related interfaces.

The cache interface 133 may expose cache-specific features accessible via a device driver for the non-volatile memory device 120. Also, in some embodiments, the SCM interface 132 presented to the storage clients 116 provides access to data transformations implemented by the one or more non-volatile memory devices 120 and/or the one or more device controllers 126.

A device driver may present a logical address space 134 to the storage clients 116 through one or more interfaces. As discussed above, the logical address space 134 may comprise a plurality of logical addresses, each corresponding to respective media locations the on one or more non-volatile memory devices 120. A device driver may maintain metadata 135 comprising any-to-any mappings between logical addresses and media locations, or the like.

A device driver may further comprise and/or be in communication with a non-volatile memory device interface 139 configured to transfer data, commands, and/or queries to the one or more non-volatile memory devices 120 over a bus 125, which may include, but is not limited to: a memory bus of a processor 111, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The non-volatile memory device interface 139 may communicate with the one or more non-volatile memory devices 120 using input-output control (IO-CTL) command(s), IO-CTL command extension(s), remote direct memory access, or the like.

The communication interface 113 may comprise one or more network interfaces configured to communicatively couple the computing device 110 and/or the device controller 126 to a network 115 and/or to one or more remote, network-accessible storage clients 116. The storage clients 116 may include local storage clients 116 operating on the computing device 110 and/or remote, storage clients 116 accessible via the network 115 and/or the communication interface 113. The device controller 126 is part of and/or in communication with one or more non-volatile memory devices 120. Although FIG. 1 depicts a single non-volatile memory device 120, the disclosure is not limited in this regard and could be adapted to incorporate any number of non-volatile memory devices 120.

The non-volatile memory device 120 may comprise one or more elements 123 of non-volatile memory media 122, which may include but is not limited to: resistive random access memory (ReRAM), Memristor memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more elements 123 of non-volatile memory media 122, in certain embodiments, comprise storage class memory (SCM).

While legacy technologies such as NAND flash may be block and/or page addressable, storage class memory, in one embodiment, is byte addressable. In further embodiments, storage class memory may be faster and/or have a longer life (e.g., endurance) than NAND flash; may have a lower cost, use less power, and/or have a higher storage density than DRAM; or offer one or more other benefits or improvements when compared to other technologies. For example, storage class memory may comprise one or more non-volatile memory elements 123 of ReRAM, Memristor memory, programmable metallization cell memory, phase-change memory, nano RAM, nanocrystal wire-based memory, silicon-oxide based sub-10 nanometer process memory, graphene memory, SONOS memory, PMC memory, CBRAM, MRAM, and/or variations thereof.

While the non-volatile memory media 122 is referred to herein as "memory media," in various embodiments, the non-volatile memory media 122 may more generally comprise one or more non-volatile recording media capable of recording data, which may be referred to as a non-volatile memory medium, a non-volatile storage medium, or the like. Further, the non-volatile memory device 120, in various embodiments, may comprise a non-volatile recording device, a non-volatile memory device, a non-volatile storage device, or the like. Similarly, a non-volatile memory element 123, in various embodiments, may comprise a non-volatile recording element, a non-volatile memory element, a non-volatile storage element, or the like.

The non-volatile memory media 122 may comprise one or more non-volatile memory elements 123, which may include, but are not limited to: chips, packages, planes, die, or the like. A device controller 126, external to the one or more non-volatile memory elements 123, may be configured to manage data operations on the non-volatile memory media 122, and may comprise one or more processors, programmable processors (e.g., FPGAs), ASICs, microcontrollers, or the like. In some embodiments, the device controller 126 is configured to store data on and/or read data from the non-volatile memory media 122, to transfer data to/from the non-volatile memory device 120, and so on.

The device controller 126 may be communicatively coupled to the non-volatile memory media 122 by way of a bus 127. The bus 127 may comprise an I/O bus for communicating data to/from the non-volatile memory elements 123. The bus 127 may further comprise a control bus for communicating addressing and other command and control information to the non-volatile memory elements 123. In some embodiments, the bus 127 may communicatively couple the non-volatile memory elements 123 to the device controller 126 in parallel. This parallel access may allow the non-volatile memory elements 123 to be managed as a group, forming a logical memory element 129. The logical memory element may be partitioned into respective logical memory units (e.g., logical pages) and/or logical memory divisions (e.g., logical blocks). The logical memory units may be formed by logically combining physical memory units of each of the non-volatile memory elements.

The device controller 126 may comprise and/or be in communication with a device driver executing on the computing device 110. A device driver may provide storage services to the storage clients 116 via one or more interfaces 131, 132, and/or 133. In some embodiments, a device driver provides a block-device I/O interface 131 through which storage clients 116 perform block-level I/O operations. Alternatively, or in addition, a device driver may provide a storage class memory (SCM) interface 132, which may provide other storage services to the storage clients 116. In some embodiments, the SCM interface 132 may comprise extensions to the block device interface 131 (e.g., storage clients 116 may access the SCM interface 132 through extensions or additions to the block device interface 131). Alternatively, or in addition, the SCM interface 132 may be provided as a separate API, service, and/or library. A device driver may be further configured to provide a cache interface 133 for caching data using the non-volatile memory system 102.

A device driver may further comprise a non-volatile memory device interface 139 that is configured to transfer data, commands, and/or queries to the device controller 126 over a bus 125, as described above.

Figure 2:
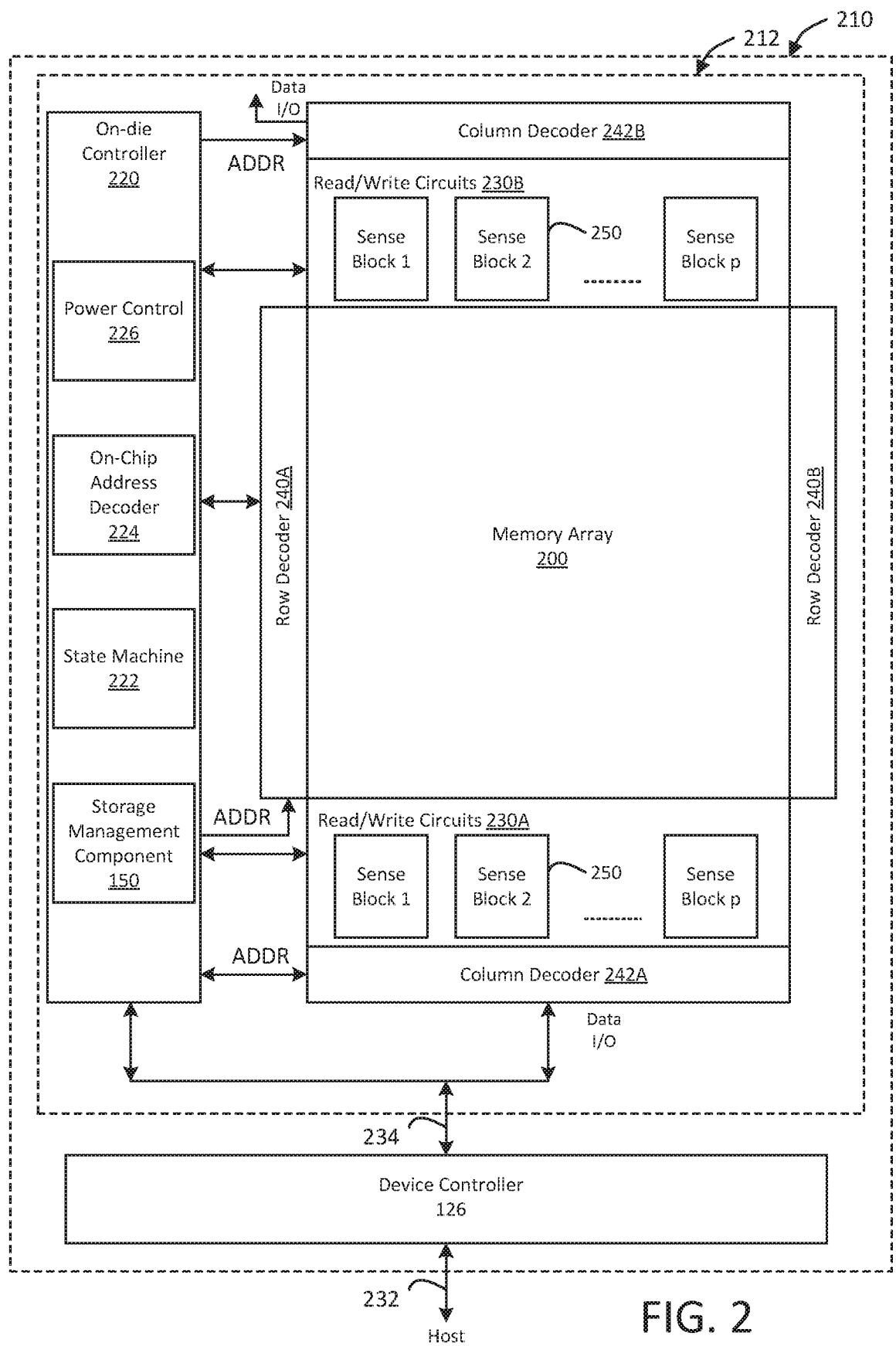
FIG. 2 is a schematic block diagram illustrating another embodiment of a system comprising non-volatile memory elements.

FIG. 2 illustrates an embodiment of a non-volatile storage device 210 that may include one or more memory die or chips 212. A memory die or chip 212 may be a non-volatile memory element 123 as described above with regard to FIG. 1. The non-volatile storage device 210 may be substantially similar to the nonvolatile memory device 120 described with reference to FIG. 1. Memory die 212, in some embodiments, includes an array (two-dimensional or three-dimensional) of memory cells 200, an on-die controller 220, and read/write circuits 230A/230B. In one embodiment, access to the memory array 200 by the various peripheral circuits is implemented in a symmetric fashion, on opposite sides of the array, so that the densities of access lines and circuitry on each side are reduced by half. The read/write circuits 230A/230B, in a further embodiment, include multiple sense blocks 250 which allow a page of memory cells to be read or programmed in parallel. In the depicted embodiment, peripheral circuits such as row decoders 240A/240B, column decoders 242A/242B, and read/write circuits 230A/230B are disposed at the edges of the memory array. In another embodiment, however, peripheral circuitry may be disposed above, below, and/or at the sides of a three-dimensional memory array 200.

The memory array 200, in various embodiments, is addressable by word lines via row decoders 240A/240B and by bit lines via column decoders 242A/242B. In some embodiments, a device controller 126 external to the memory die 212 is included in the same memory device 210 (e.g., a removable storage card or package) as the one or more memory die 212. Commands and data are transferred between the host and the device controller 126 via lines 232 and between the device controller 126 and the one or more memory die 212 via lines 234. One implementation can include multiple chips 212.

On-die controller 220, in one embodiment, cooperates with the read/write circuits 230A/230B to perform memory operations on the memory array 200. The on-die controller 220, in certain embodiments, includes a state machine 222, an on-chip address decoder 224, a power control circuit 226, and a storage management component 150, which may be substantially as described above with regard to FIG. 1. In various embodiments, a storage management component 150 may include or be embodied by an on-die controller 220, a state machine 222, a device controller 126, and/or a device driver.

The state machine 222, in one embodiment, provides chip-level control of memory operations. The on-chip address decoder 224 provides an address interface to convert between the address that is used by the host or a device controller 126 to the hardware address used by the decoders 240A, 240B, 242A, 242B. The power control circuit 226 controls the power and voltages supplied to the word lines and bit lines during memory operations. In one embodiment, power control circuit 226 includes one or more charge pumps that can create voltages larger than the supply voltage.

In one embodiment, one or any combination of on-die controller 220, power control circuit 226, on-chip address decoder 224, state machine 222, storage management component 150, decoder circuit 242A, decoder circuit 242B, decoder circuit 240A, decoder circuit 240B, read/write circuits 230A, read/write circuits 230B, and/or device controller 126 can be referred to as one or more managing circuits.

In certain embodiments, file systems may interact with a flash translation layer (FTL). As used herein, a flash translation layer may refer to a driver or controller that controls the flash memory as to cause a linear flash memory to appear to the file or operating system like a disk drive. To cause flash memory to appear as a disk drive, the FTL may create "virtual" small blocks of data out of the larger erase blocks of the flash memory. Also, the FTL may manage data on the flash memory such that it appears to be "write in place" when the managed data is actually stored in different locations in the flash memory. Further, the FTL may manage the flash memory so there are clean/erased places to store data.

In certain embodiments, a file system, as used herein may refer to a system that controls how data or units of data are stored and retrieved through interactions with the flash translation layer. As described herein, a unit of data or data may refer to information that has been codified so as to be storable in a computer readable medium. Further, the file system may manage files and perform operations on the files. In certain implementations, the file system refers to a logical file system, where the file system is responsible for file and file-level operations between the memory and a user application. Further, the file system may pass requested operations to a flash translation layer for processing. In at least one implementation, the file system may be a log structured file system.

Figure 3:
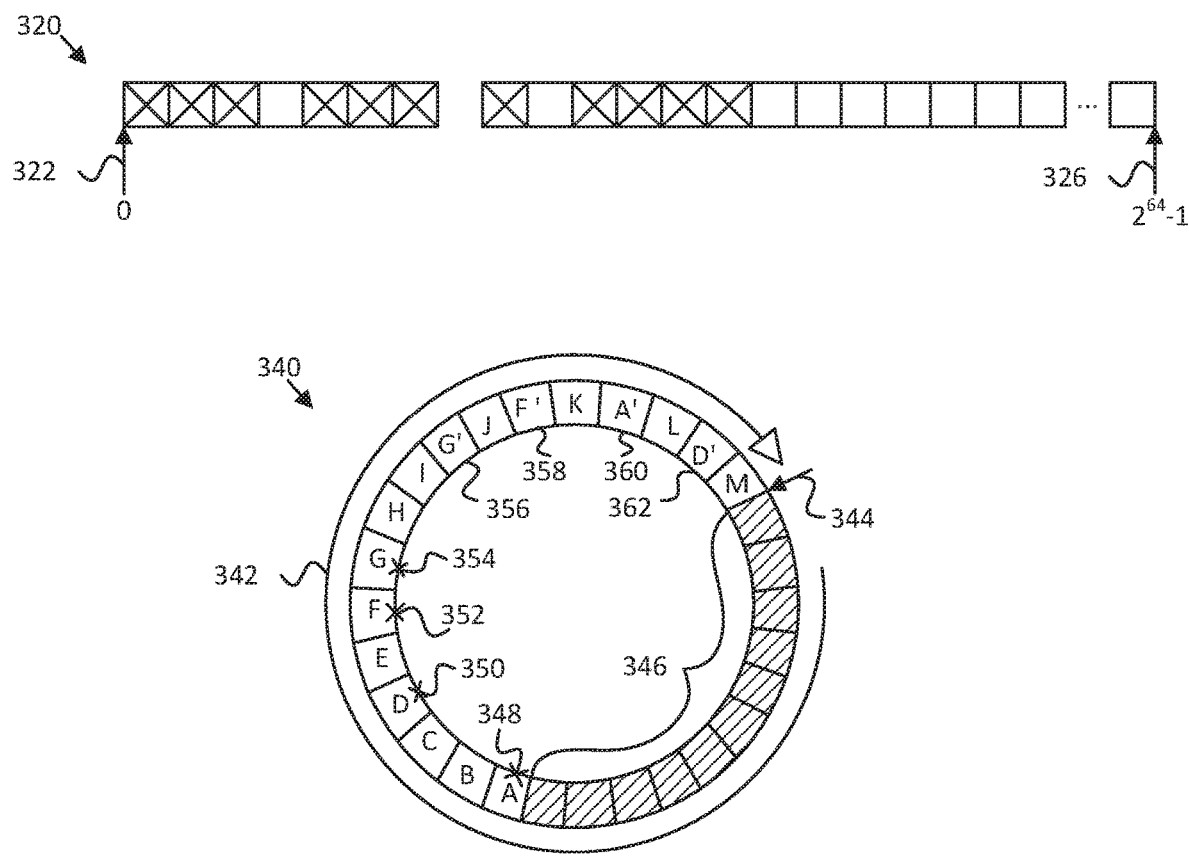
FIG. 3 depicts cyclic, sequential storage operation on a non-volatile storage device according to one embodiment.

FIG. 3 depicts one embodiment of a logical address space 320, and a sequential, log-based, append-only writing structure 340 such as found in a log structured file system. The logical address space 320 of the non-volatile memory device 120, in the depicted embodiment, may be larger than the physical storage capacity and corresponding storage device address space of the non-volatile memory device 120. In the depicted embodiment, the non-volatile memory device 120 has a 64-bit logical address space 320 beginning at logical address "0" 322 and extending to logical address $2^{64}-1$" 326. As illustrated, the logical address space 320 may store data at the locations marked by an "X" and may have available locations for storing data at the locations lacking an "X". Because the storage device address space corresponds to only a subset of the logical address space 320 of the non-volatile memory device 120, the rest of the logical address space 320 may be restricted or used for other functions of the non-volatile memory device 120.

The sequential, log-based, append-only writing structure 340, in the depicted embodiment, is a logical representation of the physical storage media 122 of the non-volatile memory device 120. In certain embodiments, the non-volatile memory device 120 stores data sequentially, appending data to the log-based writing structure 340 at an append point 344. Non-volatile storage media storing deallocated/unused logical blocks, in the depicted embodiment, is added to an available storage pool 346 for the non-volatile memory device 120. By clearing invalid data from the non-volatile memory device 120, and adding the physical storage capacity corresponding to the cleared data back to the available storage pool 346, in one embodiment, the log-based writing structure 340 is cyclic, ring-like, and has a theoretically infinite capacity.

In the depicted embodiment, the append point 344 progresses around the log-based, append-only writing structure 340 in a circular pattern 342 storing data "A" through "M". In one embodiment, the circular pattern 342 wear balances the non-volatile memory media 122, increasing a usable life of the non-volatile memory media 122. In the depicted embodiment, the file system may mark several blocks 348, 350, 352, 354 as invalid, represented by an "X" marking on the blocks 348, 350, 352, 354. The file system and the flash translation layer, in one embodiment, may recover the physical storage capacity of the invalid blocks 348, 350, 352, 354 and may add the recovered capacity to the available storage pool 346. In the depicted embodiment, modified versions of the blocks 348, 350, 352, 354 have been appended to the log-based writing structure 340 as new blocks 356, 358, 360, 362 in a read, modify, write operation or the like, allowing the original blocks 348, 350, 352, 354 to be recovered.

Figure 4:
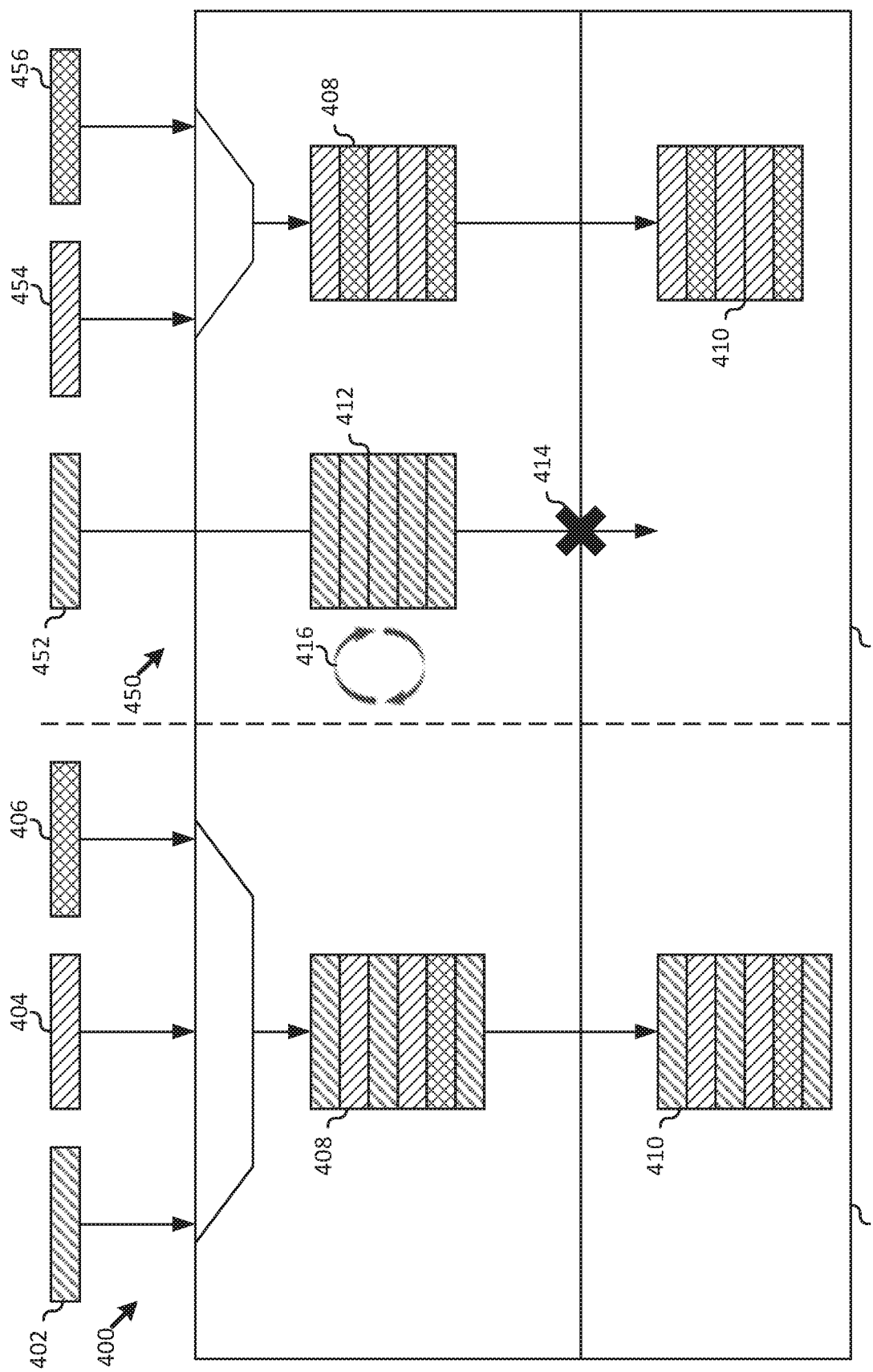
FIG. 4 is a schematic block diagram illustrating an embodiment of a system for saving data in non-volatile memory elements.

In certain embodiments, the log-based writing structure such as log-based writing structure 340 maintains multiple logs, where the data in a log may be passed to a flash translation layer for storage in a main memory. FIG. 4 illustrates different systems 400 and 450 for saving information from multiple logs into a main memory 410. As shown, the system 400 may include a first log 402, a second 404, and a third 406. The logs 402, 404, and 406 may be separate log-based writing structures such as writing structure 340. Alternatively, a log may be a logical data structure controlled by the file system to present data stored in the main memory.

In at least one embodiment, data may be saved into one of the multiple logs based on different factors. For example, data may be saved into different logs based on a data type. As used herein, a data type is a characterization of data. A data type may describe a source of the data, frequency at which the data is updated, and the like. In at least one implementation, where the data may be saved into different logs based on a data type that describes the frequency at which the data is updated, the data may be saved into a hot log, a warm log, and a cold log. For example, log 402 may be a hot log, where the data stored in the hot log may be expected to be modified frequently. Further, data stored in the hot log may be associated with small, temporary files that are created and used during the life of a process, where the temporary files may be deleted at the end of the process. Also, log 404 may be a warm log, where the data stored in the warm log may be updated less frequently than data stored in the hot log. Further, log 406 may be a cold log, where data stored in the cold log may be infrequently updated.

In at least one embodiment, when data is saved into different logs based on a data type, a file system may identify the data type based on a block type associated with the destination address of the data. For example, the file system may determine that data is to be saved in a block of memory associated with direct nodes for a directory or a directory entry and then associate that data with a hot log. Also, the file system may determine the data is to be saved in a block of memory associated with direct nodes for a regular file type and then associate that data with a warm log. Further, the file system may determine the data is to be saved in a block of memory associated with an indirect node and then associate that data with a cold log. In an alternative embodiment, the data type may be specified by a user and then associate with the correct log. For example, a user may create a file system data block and specify data to store in the file system data block. The file system may associate this data with either a hot, warm, or cold log as specified by the user. In yet another embodiment, a file system may associate data with a log based on memory operations that created the data. For example, a file system may be performing cleaning operations and the file system may identify valid data to relocate to another block of memory. As the data that was relocated was valid for a period of time before the cleaning was performed, the file system may determine that the data does not change frequently and may associate the data with a cold log.

In certain embodiments, the log-based writing structure may be controlled by a flash friendly file system (F2FS). As part of the F2FS, the file system may maintain multiple logs. In one embodiment, the F2FS may maintain six logs, including a hot node log, a hot data log, a warm node log, a warm data log, a cold node log, and a cold data log. For example, the F2FS may determine that data belongs in a hot node log when the data represents a direct node block for a directory. The F2FS may determine that data belongs in a hot data log when the data is stored in a directory entry block. The F2FS may determine that data belongs in a warm node log, when the data is stored in a direct node block for regular files. The F2FS may determine that data belongs in a warm data log when the data is stored in a data block made by a user. The F2FS may determine that data belongs in a cold node log when the data is stored in an indirect node block. The F2FS may determine that data belongs in a cold data log when the data is stored in a data block moved by cleaning, stored in a data block specified by a user, or multimedia file data. In another embodiment, the F2FS may maintain four logs by combining the warm logs with the cold logs. When the system 400 uses an F2FS, the log 402 may represent both a hot node log and a hot data log, the log 404 may represent both a warm node log and a warm data log, the log 406 may represent both a cold node log and a cold data log.

In certain embodiments, a flash translation layer 401 may translate the logical addresses for the data associated with the logs 402, 404, and 406 into physical addresses for storage in a main memory 410. As used herein, the main memory 410 may be a portion of memory on a non-volatile memory element or elements that is used for storing data as described above. In certain embodiments, the main memory may comprise a plurality of multi-level cells, where multiple bits may be stored per cell. Before, storage in the main memory 410, the data may be stored in an intermediate storage 408. As used herein, the intermediate storage 408 may be a portion of memory into which data may be stored before storing the data in the main memory 410. In certain embodiments, the intermediate storage 408 may be a single level cell storage area where a cell stores a single bit per cell. In at least one embodiment, the intermediate storage 408 may act as a FIFO buffer to reduce the amount of obsolete data that is written into the main memory 410. For example, obsolete data may be reused before being relocated into the main memory 410. Accordingly, frequently updated data may be replaced and reused before being relocated to the main memory 410.

However, when the file system controls multiple log-based writing structures, such as logs 402, 404, and 406, obsolete data may potentially be relocated into the main memory 410. For example, as the multiple log-based writing structures may sequentially write data into a new logical block address when data is changed, the flash translation layer 401 may be unaware that a previous copy of the particular logical block address is now obsolete. Accordingly, the flash translation layer 401 may unknowingly move obsolete data into the main memory 410. In particular, when one of the logs is a hot log, like log 402, where the data is updated frequently, obsolete data associated with the log 402 may frequently be moved into the main memory 410.

In certain embodiments, in FIG. 4, a system 450 may include a separate hot memory 412 or first portion of memory associated with logs that contain data that is frequently updated. For example, the hot memory 412 may be a first portion of memory that stores data of a data type that is updated frequently. The first portion may be a block, a page, a die or other sized portion of memory. In contrast to the intermediate storage 408, data stored in the hot memory 412 may be prevented from being relocated into the main memory 410. As described, herein, the main memory may be a second portion of memory. In at least one embodiment, the second portion of memory may be similar to the main memory as described above. As data in the first portion of memory, the hot memory area 412, is not relocated into the second portion of memory, the main memory, the amount of obsolete data that is relocated into the main memory 410 may be reduced. For example, system 450 may maintain three or more logs 452, 454, and 456. Log 452 may be a hot log, log 454 may be a warm log, and log 456 may be a cold log. As described above, the log 452 may be updated frequently. Before translation from the logical addresses to the physical addressing by the flash translation layer 451, a file system may attach a log ID to the data to be stored in memory. The flash translation layer 451 may then use the log IDs attached to the data to determine whether to store the data in the intermediate storage 408 or in the hot memory 412. Data having an attached log ID associated with logs 454 and 456 may be stored in the intermediate storage 408 and then relocated into the main memory 410. Conversely, data having an attached log ID associated with the log 452 may be stored in the hot memory 412, where it is kept separate from the main memory 410.

In at least one embodiment, where the file system is an F2FS, the F2FS may clean data in units of sections, where a section be a portion of memory. For example, a F2FS may use three configurable units: a segment, a section, and a zone. The segment may be a basic unit of management, a section may include consecutive segments, and a zone consists of a series of sections. In certain embodiments, a section size may be configured to be equal to a block size for the flash translation layer. Further, the F2FS may assume that the logs are written into separate open flash translation layer blocks. However, due to resource constraints, it may be impractical to maintain open blocks for the separate F2FS logs. For example, flash devices may use a single open block for data to be written and a flash translation layer may mix multiple F2FS logs together in one physical block. For example, in system 400, data from the multiple logs 402, 404, and 406 may be mixed together into one physical block. Accordingly, when a file system such as an F2FS selects a victim section for cleaning, valid data in the section may be moved to a different F2FS segments. This may increase fragmentation at the physical level as the writes may be intermixed in a single physical block. Further, when an F2FS sends a discard command to a flash device, the discard command may be translated into a series of additional moves beyond discarding the data to be cleaned. Thus, as the data to be discarded is spread between different physical blocks, the flash translation layer may perform multiple updates and relocations of valid data.

As illustrated in system 450, where frequently updated data is saved in a hot log 452, the flash translation layer 401 may perform garbage collection 416 in response to discard commands sent from the file system to the flash translation layer 451. Accordingly, discard commands sent from the file system to clean the data in the hot memory 412 may be performed by the flash translation layer 401 without having to relocate data in the main memory 410. Thus, the file system may direct the garbage collection 416 while the flash translation layer 451 may perform a second garbage collection for the main memory 410.

Figure 5:
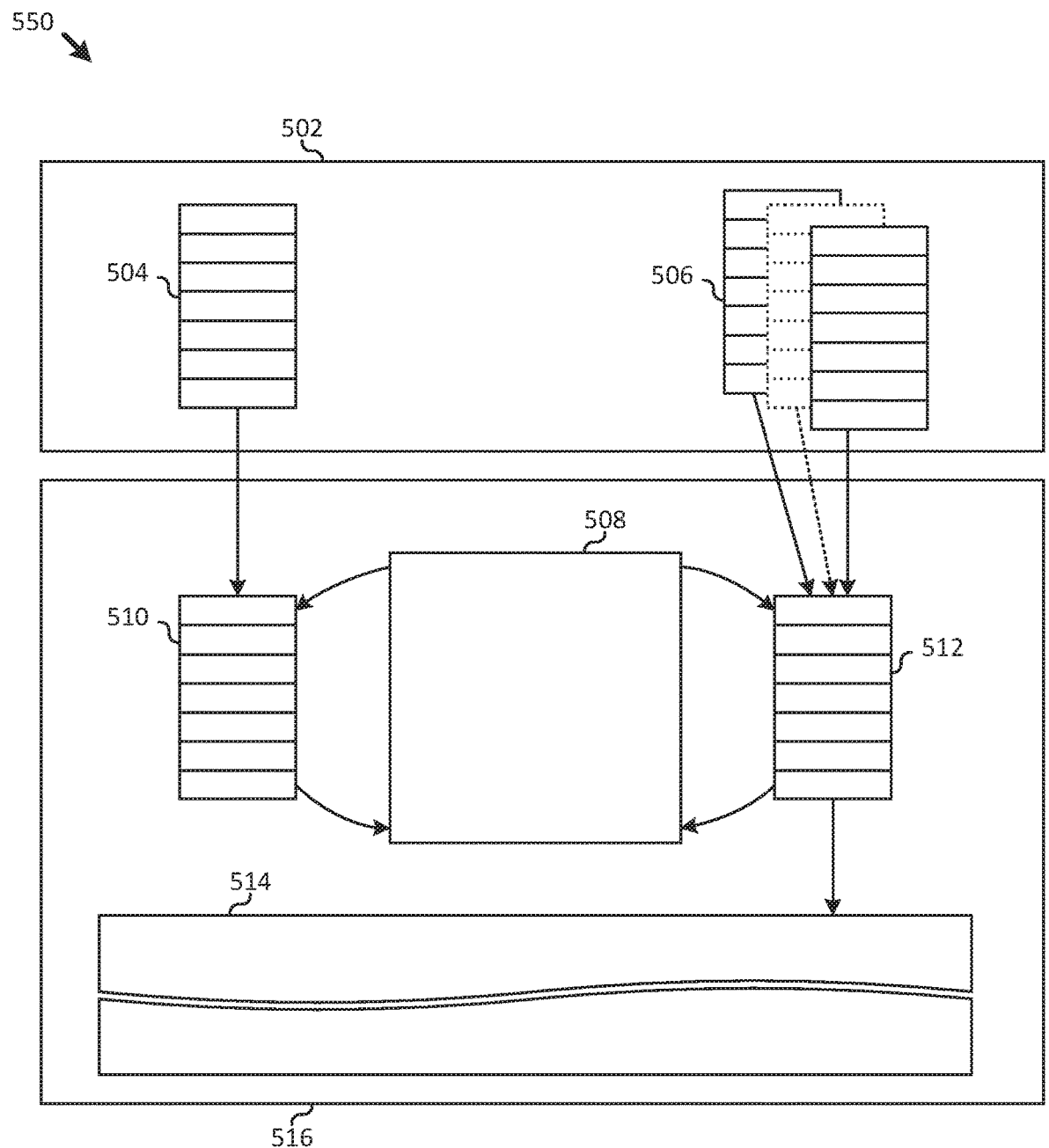
FIG. 5 is a schematic block diagram illustrating an embodiment of a system for saving data in non-volatile memory elements.

FIG. 5 illustrates a further embodiment of a system 550 having a memory that stores data associated with a frequently updated log-based writing structure. As illustrated, system 550 may include a file system 502 and a flash translation layer 516. As described above, the file system 502 may control how data is stored and retrieved through interactions with the flash translation layer 516, where the flash translation layer 516 controls a flash memory to cause the flash memory to appear to the file or operating system like a disk drive. As shown, the file system 502 may maintain different data structures 504 and 506 for the management of data units. For example, when the file system 502 receives a data unit, the file system 502 may classify the data and place it in one of the data structures 504 and 506 that is associated with the classification. In at least one embodiment, the file system 502 may classify the data units based on the frequency at which the data units are updated. As described above, data units may be classified as either "hot", "warm", or "cold", where a hot data unit is updated most frequently, a cold data unit is updated the least frequently, and a warm data unit is updated at rate between that of hot and cold data units. Accordingly, hot data units may be saved in a hot data structure 504, and warm and cold data units may be saved in warm and cold data structures 506. In at least one implementation, the data structures 504 and 506 may be log-based writing structures that function as described above with regards to FIG. 3. When the file system 502 saves the data in one of the data structures in the data structures 504 and 506, the file system 502 may attach an identifier, such as a log ID to the data units. For example, the file system 502 may attach a hot log ID to data units stored in a hot log-based writing structure, a warm log ID to data units stored in a warm log-based writing structure, and a cold log ID to data units stored in a cold log-based writing structure.

In at least one embodiment, when data is saved in the data structures 504 and 506. The flash translation layer 516 may translate the logical addresses of the data units for saving in the main memory 514. However, to avoid the saving of obsolete data in the main memory 514, the flash translation layer may save the data units in either an intermediate storage 512 or a hot log memory area 510 based on the log IDs that were attached by the file system 502 to the data units. For example, when a data unit has an attached hot log ID, the flash translation layer 516 may save the data unit in the hot log memory area 510. When a data unit has an attached warm or cold log ID, the flash translation layer 516 may save the data unit in the intermediate storage 512. The flash translation layer may relocate data units that are stored in the intermediate storage 512 into the main memory.

In certain embodiments, the flash translation layer 516 may assign subdivisions of memory to the intermediate storage 512 and the hot log memory area 510 from a common memory pool 508, where the common memory pool 508 is a portion of memory in a non-volatile memory array that may be allocated by a controller for particular storage purposes, for example, allocated to the intermediate storage 512 or to the hot log memory area 510. As used herein, a subdivision of memory may refer to a piece of memory that may be assignable by the flash translation layer 516 to store different portions of memory. For example, a subdivision of memory may refer to a block of memory, or other divisible part of the memory. In at least one embodiment, where a subdivision of memory is a memory block, the flash translation layer 516 may assign blocks of memory to the hot log memory area 510 and the intermediate storage 512. In certain embodiments, where the file system 502 is an F2FS, a size of a section for the file system 502 may be equal to a block.

In at least one embodiment, the file system 502 directs garbage collection for the hot log memory area 510 and the flash translation layer 516 controls the garbage collection for the intermediate storage 512 and the main memory 514. When the file system 502 directs garbage collection, the file system 502 may send discard commands to the flash translation layer 516, directing the flash translation layer 516 to release blocks of memory that contain obsolete data. As described above, the hot log memory area 510 may be a FIFO data structure, where data is written into the data structure as directed by the file system 502. When the file system 502 saves data in sequential log-based writing structures, updated data may be saved in different locations from the data that was to be replaced by the updated data. Accordingly, the flash translation layer 516 may be unable to determine whether data in the hot log memory area 510 is obsolete. Thus, the file system 502 may control the garbage collection for the hot log memory area 510 by sending discard commands for the subdivisions of memory to be cleaned by the file system garbage collection. In certain embodiments, the file system 502 may send a discard command that specifies a section of memory to discard. In at least one embodiment, a section, as specified by the file system 502 may be the same size as a block of memory controlled by the flash translation layer 516. Accordingly, when the file system 502 directs the flash translation layer 516 to discard a section of memory, the flash translation layer 516 may release a block of memory in the hot log memory area 510 back into the common memory pool 508. By having a section size of the file system 502 equal to a block size for the flash translation layer 516, the flash translation layer 516 may more efficiently release blocks of memory from the hot log memory area 510 back into the common memory pool 508. For example, the amount of data to be relocated may be reduced by having the section size equal to the block size.

In at least one embodiment, the flash translation layer 516 controls the garbage collection for the intermediate storage 512. When deleting a block of memory from the intermediate storage 512, the flash translation layer 516 may identify the valid data in the block of memory and relocate the valid data into a transfer unit, where a transfer unit may be a block of memory in an erase state. In certain embodiments, the transfer unit may be a block of memory in the main memory 514. Accordingly, when deleting a block of memory from the intermediate storage 512, the flash translation layer 516 may move the valid data in a block of memory to be discarded and relocate the valid data into the transfer unit in the main memory 514. Alternatively, the transfer unit may be a block of memory in the intermediate storage 512. Thus, when deleting a block of memory from the intermediate storage 512 the flash translation layer 516 may relocate the valid data from the block of memory to be discarded to a transfer unit in the intermediate storage 512. When a block of memory has been discarded by the flash translation layer 516, the flash translation layer 516 may indicate that the block of memory is in the erase state and may release the block of memory into the common memory pool 508. Accordingly, the flash translation layer 516 and the file system 502 function together to control the garbage collection of the intermediate storage 512 and the hot log memory area 510.

Figure 6:
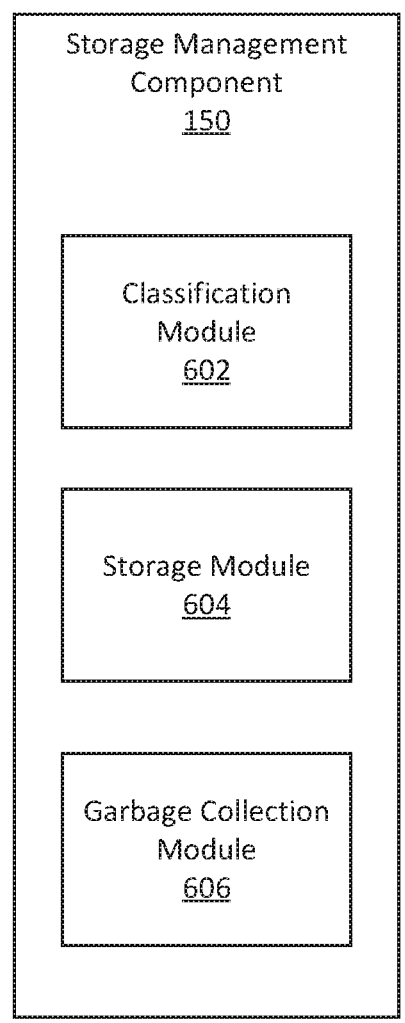
FIG. 6 is a schematic block diagram illustrating an embodiment of a relocation reduction component.

FIG. 6 depicts at least one embodiment of a storage management component 150. The storage management component 150 may be substantially similar to the storage management component 150 described above with regard to FIGS. 1-5. In general, as described above the storage management component 150 may be configured to store data that is updated frequently in a first portion of memory and store data that is updated less frequently and a second portion of memory, where the second portion of memory may be relocated into main memory of a non-volatile memory device. For example, the storage management component 150 may store frequently updated data in the hot memory area and less frequently updated data in an intermediate storage. Accordingly, the storage management component 150 may reduce the amount of frequently updated data that is relocated into main memory. In the depicted embodiment, the storage management component 150 includes a classification module 602, a storage module 604, and a garbage collection module 606. In various embodiments, a controller, such as an on-die controller 220 for a single non-volatile memory element 123, a device controller 126 for a device comprising one or more non-volatile memory elements 123, a device driver comprising executable code stored on a computer-readable storage medium, or the like, may include the classification module 602, the storage module 604, and the garbage collection module 606.

The classification module 602, in one embodiment, is configured to classify data by log type at a file system level. In certain embodiments, the storage management component 150 may include a file system that interacts with a flash translation layer. In certain embodiments, the file system may save data in one of multiple log-based writing structures. To determine which of the multiple log-based writing structures save the data, the classification module 602 may classify the data according to measurable parameters. For example, measurable parameters may include the frequency at which the data is updated, the frequency at which the data is accessed, the data source, data type, and the like. In at least one embodiment, where the classification module 602 classifies the data based on the frequency at which the data is updated, the classification module 602 may determine that the data is either hot, warm, or cold, where hot data is updated the most frequently, warm data is updated less frequently, and the cold data is updated the least frequently. As data is classified, it may be saved within a log-based writing structure according to the classification. For example, hot data may be saved in a hot log-based writing structure, warm data may be saved in a warm log-based writing structure, and cold data may be saved in a cold log-based writing structure. In a further embodiment, there may be multiple hot, warm, and cold classifications. For example, there may be data log-based writing structure and a node log-based writing structure for hot, warm, and cold data.

In further embodiments, the classification module 602 is configured to attach a log ID identifying the log type associated with the data. For example, based on the classification of the data, the classification module 602 may attach a log ID to the data. The log ID may be used to indicate the data type to a flash translation layer. In one particular embodiment, where the data is stored in a multi log file system, the log ID indicates the log-based writing structure that stores the data. A file system may communicate a log ID for data when the data is being stored into physical memory as directed by a flash translation layer. For example, a file system may communicate a log ID associated with a hot log-based writing structure for data stored in a hot log-based writing structure. Similarly, a file system may communicate log IDs associated with both the warm and cold log-based writing structures for data that is respectively stored in warm or cold log-based writing structures. The classification module 602 may also attach other information to the data to communicate information that may be used by the flash translation layer when storing the data within the physical memory.

The storage module 604, in one embodiment, is configured to store the data having a first log ID in a first portion of memory in the data having a second log ID in a second portion of memory. As depicted, the storage module 604 may use the information attached by the classification module 602 to determine in which portion of memory to store the data. The storage module 604 may identify multiple portions of memory in which data may be saved based on a log ID. In at least one embodiment, the storage module 604 may divide a memory into an intermediate storage and a main memory. In at least one embodiment, the main memory may store multiple bits per cell and the intermediate storage may store a single bit per cell. In certain embodiments, the storage module 604 may allocate memory blocks for the intermediate storage from a common memory pool. In addition to allocating blocks for the intermediate storage, the storage module 604 may also allocate memory blocks from the common memory pool for usage by a memory area configured to be used for data that is updated frequently. The memory area that stores frequently updated data may be known as a hot memory area. Storage module 604 may also divide the common memory pool into multiple storage areas based on the frequency the data is updated along with other parameters. In an additional embodiment, the storage module 604 maintains the intermediate storage and the hot memory area in separate partitions. For example, the hot memory area may exist in an enhanced user data area (EUDA) partition.

In certain embodiments, as the storage module 604 receives data to be stored in memory, the storage module 604 may identify the log ID associated with the data to be stored. As the storage module 604 identifies log IDs of data, the storage module 604 may store the data into different areas of memory based on the log IDs. For example, when the log ID indicates that the data is frequently updated, the storage module 604 may store the data in the frequently updated data area also known as the hot memory area. When the log ID is a log ID that is different from the log ID indicating that data is frequently updated, the storage module 604 may store the data in the intermediate storage. Further, for data stored in the intermediate storage, the storage module 604 may relocate the intermediate storage data into a main memory area. However, a storage module 604 may prevent the data in the hot memory area from being relocated into the main memory area. Accordingly, frequently updated data may be maintained within the hot memory area and other data may be stored in the intermediate storage and in the main memory area.

The garbage collection module 606, in one embodiment, is configured to perform garbage collection in a first portion of memory, such as the hot memory area, as directed by a file system. Further, the garbage collection module 606 may perform garbage collection on data stored in the intermediate storage and the main memory area. When the garbage collection module 606 performs garbage collection for the hot memory area, a file system may provide discard commands to a flash translation layer, where the discard commands instruct the flash translation layer to discard a section of memory. When the flash translation layer receives a discard command for a section of memory, the garbage collection module 606 may erase the data block in the hot memory area containing the data associated with the discard command.

In certain embodiments, when reclaiming data in response to a discard command from the file system, the garbage collection module 606 may identify multiple blocks of memory containing the data associated with the discard command. The garbage collection module 606 may relocate the data in the identified blocks of memory other than the data associated with the discard command into a block of memory in the erase state and then the garbage collection module 606 may erase the identified multiple blocks of memory. Alternatively, where a section of memory corresponds to a block of memory and the section of memory and the block of memory are the same size, the garbage collection module 606 may identify the block of memory in the hot memory area associated with the section specified in the discard command and erase the block of memory. In certain embodiments, the file system may send a discard command for a unit of data that is smaller than a section of memory. When the file system sends a discard command for a smaller unit of data, the garbage collection module 606 may identify the block of memory in the hot memory area containing the smaller unit of data, relocate data other than the smaller unit of data into a block of memory in the erase state, and erase the block of memory containing the smaller unit of data.

In at least one embodiment, the garbage collection module 606 also performs garbage collection for the intermediate storage and the main memory area. As described above, the intermediate storage and the main memory area store data that is updated less frequently than data stored in the hot memory area. Also, as described above, the storage module 604 relocates data stored in the intermediate storage into the main memory area. Accordingly, in certain embodiments, the garbage collection module 606 performs garbage collection for the main memory area. When performing garbage collection for the main memory area, a flash translation layer may identify a block of memory containing invalid data, identify the valid data in the block of memory, relocate the valid data into a block of memory in the erase state, and erase the block of data containing the invalid data. In certain embodiments, the garbage collection module 606 performs garbage collection for the intermediate storage in a similar manner as performed for the main memory area. Alternatively, the garbage collection module 606 performs garbage collection for the intermediate storage as blocks of memory are relocated into the main memory. As the data in the intermediate storage and the main memory area may be less frequently updated than data in the hot memory area, the amount of data relocations and garbage collection in the main memory area that result from updating data may be reduced. Additionally, by separating data in the hot memory area from data in the intermediate storage and the main memory area, the intermixing of logs may be reduced, thus improving the data homogeneity within the physical data blocks. By improving the data homogeneity within the physical data blocks, the amount of garbage collection performed by a flash translation layer may be decreased.

In certain embodiments, as described above, the storage module 604 may allocate blocks of memory from a common memory pool for use within the hot memory area. When the garbage collection module 606 performs garbage collection for the hot memory area, memory blocks that are erased in the hot memory area may be released to the common memory pool. Also, when performing garbage collection, the storage module 604 may allocate a block of memory from the common memory pool for use by the garbage collection module 606 when relocating valid data into an erased block of memory. In at least one embodiment, where the storage module 604 also allocates blocks of memory from the common memory pool for use within the intermediate storage, the garbage collection module 606 may release blocks of memory back into the common memory pool from the intermediate storage when the blocks of memory are relocated into the main memory area. In certain embodiments, a common memory pool may be used to perform wear leveling for a group of physical blocks. For example, the hot memory area and the intermediate storage may both use a single level memory cells for storing data. By allocating blocks of memory from a common memory pool to both the hot memory area and intermediate storage, where leveling may be performed for the group of single level cells that are allocated for use by the hot memory area and the intermediate storage.

Figure 7:
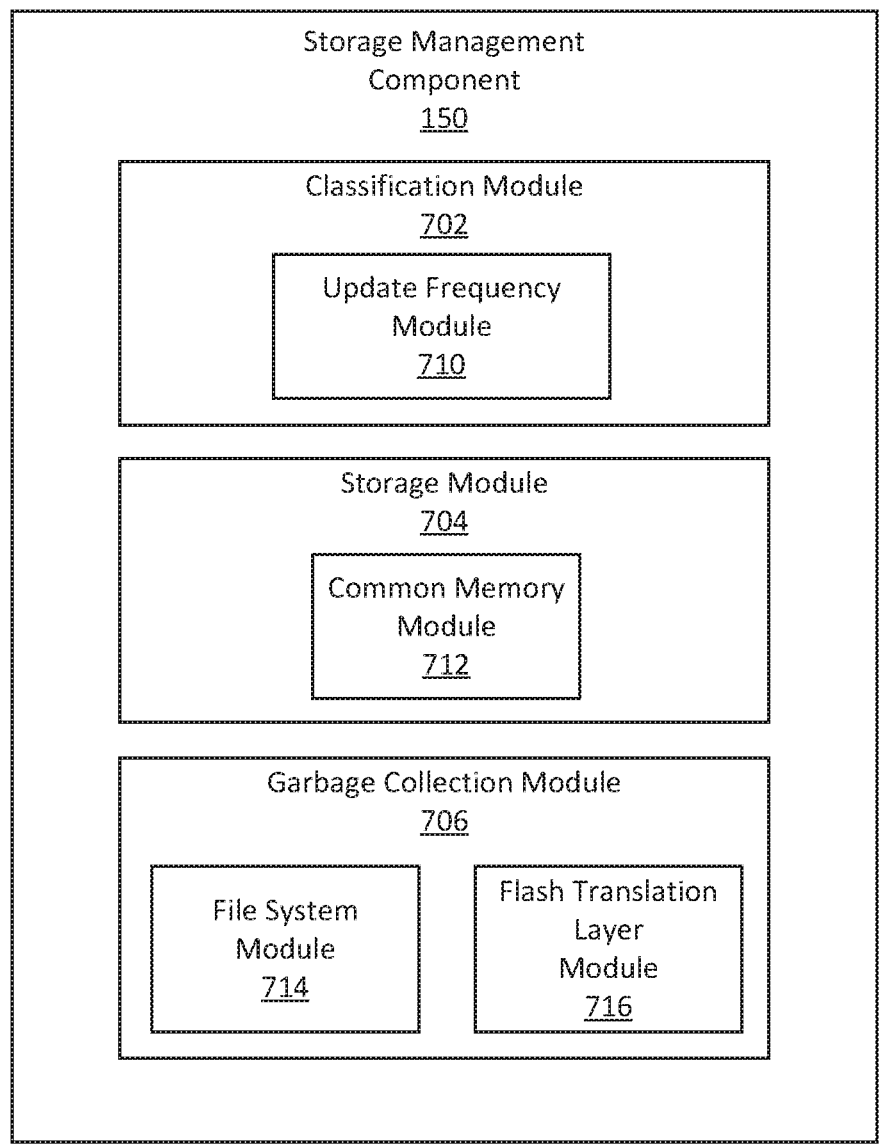
FIG. 7 is a schematic block diagram illustrating another embodiment of a relocation reduction component.

FIG. 7 depicts another embodiment of a storage management component 150. The storage management component 150, in various embodiments, may be substantially similar to the storage management component 150 described above with regard to FIGS. 1-6. In the depicted embodiment, the storage management component 150 includes a classification module 702, a storage module 704, and a garbage collection module 706, which may be configured substantially as described above with regard to FIG. 6. The classification module 702, in the depicted embodiment, further includes an update frequency module 710. The storage module 704, in the depicted embodiment, further includes a common memory module 712. The garbage collection module 706, in the depicted embodiment, further includes a file system module 714 and a flash translation layer module 716.

The update frequency module 710, in one embodiment, is configured to determine the frequency with which data to be stored is updated. In at least one embodiment, the update frequency module 710 may determine how often data may be updated based on the type of data being saved. For example, the update frequency module 710 may determine whether data is a node type or a data type. When the update frequency module 710 determines that the data is a node type, the update frequency module 710 may determine that the data will be updated frequently when the data is to be saved as a direct node block for directories. Conversely, the update frequency module 710 may determine that the data will be updated less frequently when the data is to be saved as a direct node block for regular files or an indirect node block. When the update frequency module 710 determines of the data is a data type, the update frequency module 710 may determine that the data will be updated frequently when the data is to be saved as a directory entry block. Conversely, the update frequency module 710 may determine that the data will be updated less frequently when the data is to be saved as a data block made by a user, a data block moved by cleaning, a cold data block specified by a user, or a multimedia file. As described above, when the update frequency module 710 determines that data is to be updated frequently, the storage module 704 may store the frequently updated data in a hot memory area.

The common memory module 712, in one embodiment, is configured to manage the provision of memory subdivisions for different portions of memory from a common memory pool. The common memory module 712 maintains multiple memory blocks that may be used to store data before the data is relocated into a main memory area. In certain embodiments, the common memory module 712 allocates memory blocks for use in a hot memory area and allocate memory blocks for use in an intermediate storage. Further, the common memory module 712 may allocate memory blocks where a cell memory is able to store a single bit. Also, when the intermediate storage in the hot memory area release memory blocks, the common memory module 712 may aggregate the release memory blocks into the common memory pool.

The file system module 714, in one embodiment, is configured to control the garbage collection for a frequently updated memory area. File system module 714 may control the garbage collection for a frequently updated memory area by providing discard commands for a section of memory to a flash translation layer. For example, the file system module 714 may identify a section of memory to be erased and prepared for erasure by relocating valid data to the head of a log-based writing structure or other data structure maintained by the file system module 714. The file system module 714 may then send a discard command to the flash translation layer directing the flash translation layer to discard the section of memory. Alternatively, the file system module 714 may send a discard command that directs the flash translation layer to discard a particular unit of memory.

The flash translation layer module 716, in one embodiment, is configured to control the garbage collection for the main memory area and the intermediate storage. As described above, the intermediate storage and the main memory area store data that is updated less frequently than data stored in the hot memory area. Also, as described above, the storage module 704 relocates data stored in the intermediate storage into the main memory area. Accordingly, in certain embodiments, the flash translation layer module 716 may perform garbage collection for the main memory area. When performing garbage collection for the main memory area, the flash translation layer module 716 may identify a block of memory containing invalid data, identify the valid data in the block of memory, relocate the valid data into a block of memory in the erase state, and erase the block of data containing the invalid data. In certain embodiments, the flash translation layer module 716 performs garbage collection for the intermediate storage in a similar manner as performed for the main memory area. Alternatively, the garbage collection module 706 performs garbage collection for the intermediate storage by releasing blocks of memory to the common memory pool when valid data stored on the blocks of memory is relocated from the intermediate storage to the main memory. As described above, the common memory pool services the first portion of memory and the intermediate storage. Blocks of memory from the common memory pool may not be used by the main memory.

Figure 8:
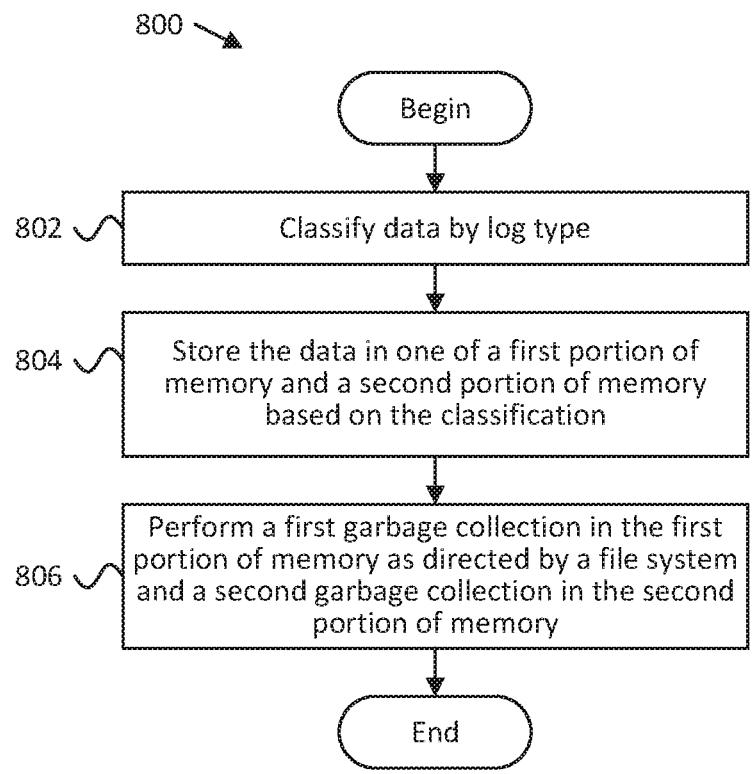
FIG. 8 is a schematic flow chart diagram illustrating one embodiment of a method for relocation reduction in a flash device.

FIG. 8 depicts one embodiment of a method 800 for relocation reduction in a flash device. The method 800 begins, and the classification module 602 classifies 802 data by log type at the file system level. The storage module 604 stores 804 the data in one of the first portion of memory and a second portion of memory based on the classification. The garbage collection module 606 performs 806 a first garbage collection in the first portion of memory as directed by a file system and a second garbage collection in the second portion of memory, and the method 800 ends. In certain embodiments, the method 800 may be performed repeatedly either synchronously in the foreground or asynchronously as a background process.

In various embodiments, a means for storing data in separate storage spaces based on a log type may include a classification module 602, an update frequency module 710, a storage management component 150, a state machine 222, an on-die controller 220, a device controller 126, a device driver, other logic hardware and/or other executable code stored on a computer readable storage medium. Other embodiments may include similar or equivalent means for storing data in separate storage spaces based on a log type.

In various embodiments, a means for reclaiming a first portion of memory in a first storage space associated with the first log type may include a garbage collection module 706, a file system module 714, a flash translation layer module 716, a storage management component 150, a state machine 222, an on-die controller 220, a device controller 126, a device driver, other logic hardware and/or other executable code stored on a computer readable storage medium. Other embodiments may include similar or equivalent means for reclaiming a first portion of memory in a first storage space associated with a first log type.

In various embodiments, a means for reclaiming a first portion of memory in a first storage space associated with a first log type may include a garbage collection module 608, a file system module 714, a flash translation layer module 716, a storage management component 150, a state machine 222, an on-die controller 220, a device controller 126, a device driver, other logic hardware and/or other executable code stored on a computer readable storage medium. Other embodiments may include similar or equivalent means for reclaiming memory in a first storage space.

In various embodiments a means for reclaiming a second portion of memory in a second storage space associated with a second log type may include a garbage collection module 608, a flash translation layer module 716, a storage management component 150, a state machine 222, an on-die controller 220, a device controller 126, a device driver, other logic hardware and/or other executable code stored on a computer readable storage medium. Other embodiments may include similar or equivalent means for reclaiming memory in a second storage space.

In various embodiments, a means for providing memory subdivisions to a first portion of memory and to an intermediate storage may include a storage module 706, a common memory module 712, a storage management component 150, a state machine 222, an on-die controller 220, a device controller 126, a device driver, other logic hardware and/or other executable code stored on a computer readable storage medium. Other embodiments may include similar or equivalent means for providing memory subdivisions for different portions of memory.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus comprising:
   a non-volatile memory element comprising a first portion of memory, an intermediate storage, and a second portion of memory; and
   a controller configured to:
   receive a plurality of units of data;
   classify the units of data using at least a first data type and second data type;
   store a first unit of data having the first data type in the first portion of memory and a second unit of data having the second data type in the intermediate storage, wherein the controller relocates the second unit of data to the second portion of memory;
   perform a first garbage collection operation for the first portion of memory, wherein the first garbage collection operation comprises receiving a discard command and erasing a data block without relocating data; and
   perform a second garbage collection operation for the second portion of memory, wherein the second garbage collection operation comprises relocating data within the second portion of memory.

2. The apparatus of claim 1, wherein the first portion of memory comprises single-level cells configured to store one bit per non-volatile memory cell and the second portion comprises multi-level cells configured to store multiple bits per non-volatile memory cell.

3. The apparatus of claim 1, wherein the first data type and the second data type indicate an update frequency for the units of data.

4. The apparatus of claim 1, wherein the discard command is received from a log structured file system.

5. The apparatus of claim 1, wherein the controller is further configured to assign subdivisions of memory from a common memory pool to the first portion of memory and to the intermediate storage.

6. The apparatus of claim 5, wherein garbage collection for the first portion of memory and the intermediate storage releases the subdivisions of memory into the common memory pool.

7. A method comprising:
   classifying data by log type at a file system level;
   storing the data in one of a first portion of memory and a second portion of memory based on the classification, wherein the first portion of memory comprises single-level cells configured to store one bit per non-volatile memory cell and the second portion of memory comprises multi-level cells configured to store multiple bits per non-volatile memory cell; and performing a first garbage collection operation in the first portion of memory in response to a request from a file system and a second garbage collection operation in the second portion of memory based on entries for the second portion of memory in a flash translation layer, wherein performing the first garbage collection operation comprises receiving a discard command and erasing a data block without relocating data.

8. The method of claim 7, wherein classifying by log type comprises classifying the data based on an update frequency for the data.

9. The method of claim 7, further comprising assigning subdivisions of memory from a common memory pool to the first portion of memory and to an intermediate storage, wherein the data stored in the second portion of memory is relocated from the intermediate storage into the second portion of memory.

10. The method of claim 9, wherein performing the first garbage collection operation in the first portion of memory releases the subdivisions of memory into the common memory pool.

11. An apparatus comprising:
means for storing data in separate storage spaces based on a log type;
means for reclaiming a first portion of memory in a first storage space associated with a first type for the log type, wherein the means for reclaiming the first portion of memory receives a discard command and erases a data block without relocating data; and
means for reclaiming a second portion of memory in a second storage space associated with a second type for the log type,
wherein the first portion of memory comprises single-level cells configured to store one bit per non-volatile memory cell and the second portion of memory comprises multi-level cells configured to store multiple bits per non-volatile memory cell.

12. The apparatus of claim 11, further comprising means for providing memory subdivisions from a common pool to the first portion of memory and to an intermediate storage.

13. The apparatus of claim 11, wherein the means for reclaiming the second portion of memory operates within a flash translation layer.

\* \* \* \* \*